United States Patent [19]

Davis et al.

[11] 4,216,129

[45] Aug. 5, 1980

[54] MOLDING COMPOSITION COMPRISING A BLEND OF POLY (TETRAMETHYLENE TEREPHTHALATE) AND POLY(TETRAMETHYLENE TEREPHTHALATE) MODIFIED WITH DIMER ACID

[75] Inventors: Burns Davis; Freddie A. Shepherd, both of Kingsport, Tenn.

[73] Assignee: Eastman Kodak Company, Rochester, N.Y.

[21] Appl. No.: 10,190

[22] Filed: Feb. 7, 1979

Related U.S. Application Data

[63] Continuation-in-part of Ser. No. 868,764, Jan. 12, 1978, abandoned.

[51] Int. Cl.$^2$ .......................... C08G 63/02; C09J 3/16
[52] U.S. Cl. .................................... 260/22 D
[58] Field of Search ....................... 260/22 D

[56] References Cited

U.S. PATENT DOCUMENTS

| | | | |
|---|---|---|---|
| 2,059,791 | 11/1936 | Hennegan et al. | 260/22 CQ |
| 2,110,042 | 3/1938 | Hall et al. | 260/22 R |
| 3,077,459 | 2/1963 | Hershey et al. | 260/22 R |
| 3,736,278 | 5/1973 | Wada et al. | 260/22 CB |
| 3,883,611 | 5/1975 | Nelson | 260/22 D |
| 3,915,913 | 10/1975 | Jackson et al. | 260/22 D |
| 3,923,927 | 12/1975 | Miyake et al. | 260/22 D |
| 3,931,073 | 1/1976 | Jackson et al. | 260/22 D |
| 3,946,091 | 3/1976 | Sakata et al. | 260/22 CQ |
| 4,054,561 | 10/1977 | Strauss et al. | 260/22 R |

*Primary Examiner*—Ronald W. Griffin
*Attorney, Agent, or Firm*—William P. Heath, Jr.; Daniel B. Reece, III

[57] ABSTRACT

A composition comprised of an admixture of poly-(tetramethylene terephthalate) and poly(tetramethylene terephthalate) modified with dimer acid. This composition exhibits enhanced flexural modulus and enhanced flexural strength compared with a poly(tetramethylene terephthalate) which has been modified with dimer acid and contains an amount of dimer acid equivalent to the admixture.

12 Claims, No Drawings

MOLDING COMPOSITION COMPRISING A BLEND OF POLY (TETRAMETHYLENE TEREPHTHALATE) AND POLY(TETRAMETHYLENE TEREPHTHALATE) MODIFIED WITH DIMER ACID

This invention relates to compositions which can be molded into articles having enhanced flexural modulus and enhanced flexural strength.

The use of thermoplastic polymers for molding useful articles has increased tremendously in the last several decades. Today, the wide variety of articles molded from thermoplastic polymers ranges from small articles to large articles and from articles for low strength service to articles for high strength service.

One of the most desirable classes of thermoplastic polymers for molding articles for high strength service applications is polyesters. Polyesters are reasonable in cost, can be handled easily and can be molded with little difficulty.

One of the most desirable thermoplastic polyesters for molding articles for high strength service is poly(tetramethylene terephthalate) type polyesters, because these types of polyesters generally exhibit a desirable overall balance of most mechanical properties. Although articles molded from poly(tetramethylene terephthalate) modified with dimer acid to exhibit a desirable overall balance of general mechanical properties, enhancement of the flexural modulus and flexural strength would further increase the utility of articles molded from this polyester.

We have now invented a composition which can be molded into articles having enhanced flexural modulus and flexural strength. These compositions can be very broadly regarded as comprised of an admixture of poly(tetramethylene terephthalate) and poly(tetramethylene terephthalate) which has been modified with dimer acid.

The closest prior art applicants are aware of is disclosed in U.S. Pat. No. 3,915,913 and U.S. Pat. No. 3,931,073. These patents relate to polyesters of dimer acid modified poly(tetramethylene terephthalate) which can be blended with a vinyl aromatic polymer, such as polystyrene. Applicants regard the disclosure in these patents of poly(tetramethylene terephthalate) modified with dimer acid to be the closest prior art.

The compositions of this invention are thought to be patentable because the compositions exhibit a combination of an unobviously high flexural modulus and flexural strength compared to dimer acid modified poly(tetramethylene terephthalate) alone.

As is well known in the art, when polymeric materials are blended together the properties of the combination of polymeric materials tend to reflect the characteristics and amounts of each component of the blend. Thus, if polymeric material A is chemically modified to incorporate polymerizable material B into the polymer chain and the value of a selected property observed, and if a similar material containing more polymerizable material B is then blended with additional polymeric material A so as to result in the same amount of polymerizable material B in the blend and the value of the same selected property observed, it would be expected that the two values would be quite similar. Stated another way, one would expect that the effect of polymerizable material B would be about the same whether or not polymerizable material B is all polymerized into polymeric material A or whether just a portion of polymeric material A contains polymerizable material B. Surprisingly, we have found that the flexural modulus and flexural strength of a blend of poly(tetramethylene terephthalate) and poly(tetramethylene terephthalate) modified with dimer acid is unexpectedly greater than the flexural modulus and flexural strength of only the poly(tetramethylene terephthalate) modified with dimer acid.

The compositions of this invention are compositions comprised of an admixture of (A) from about 95 to about 5 parts by weight poly(tetramethylene terephthalate) having an inherent viscosity of about 0.5 or more, and (B) from about 5 to about 95 parts by weight of a polyester having an inherent viscosity of about 0.5 or more comprised of
  (1) a dicarboxylic acid component which is
    (a) from about 98 to about 40 mole percent terephthalic acid, and
    (b) from about 2 to about 60 mole percent dimer acid, and
  (2) tetramethylene glycol.

In other embodiments of our invention, the respective ranges of the several components are as follows: (A) may be about 95 to about 50, about 95 to about 75 and about 90 to about 10; (B) may be about 5 to about 50, about 5 to about 25 and about 10 to about 90; (B) (1) (a) may be about 98 to about 40, about 95 to about 40 and about 90 to about 60; and (B) (1) (b) may be about 2 to about 60, about 5 to about 60 and about 10 to about 40 mole percent.

The poly(tetramethylene terephthalate) useful in this invention is comprised of terephthalic acid and 1,4-butanediol, and can also be called poly(butylene terephthalate). In some cases a small portion of the terephthalic acid may be replaced with another dicarboxylic acid as long as the unobvious properties of the composition of the invention are maintained. Examples of other dicarboxylic acids are oxalic, malonic, dimethylmalonic, succinic, glutaric, adipic, 2-methyladipic, trimethyladipic, pimelic, 2,2-dimethylglutaric, 3,3-diethylsuccinic, azelaic, sebacic, suberic, fumaric, maleic, 1,2-cyclopentanedicarboxylic, 1,3-cyclopentanedicarboxylic, 1,2-cyclohexanedicarboxylic, 1,3-cyclohexanedicarboxylic, 1,4-cyclohexanedicarboxylic, phthalic, isophthalic, 4-methylisophthalic, t-butylisophthalic, 1,4-naphthalic, 4,4'-sulfonyldibenzoic, 2,5-naphthalenedicarboxylic, 2.6-naphthalenedicarboxylic, and 2,7-naphthalenedicarboxylic acids. It will be understood that the corresponding esters of the dicarboxylic acids, such as dimethyl terephthalate, are included in the term "dicarboxylic acid".

In some cases a portion of the 1,4butanediol can be replaced with a small amount of another diol if the unobvious properties of the composition of the invention are maintained. Examples of diols are ethylene glycol, diethylene glycol, 1,2-propylene glycol, 2,4-dimethyl-2-ethylhexane-1,3-diol, 2,2,4-trimethyl-1,3-pentanediol, 2,2-dimethyl-1,3-propanediol, 2-ethyl-2-butyl-1,3-propanediol, 2,2-diethyl-1,3-propanediol, 2-methyl-2-propyl-1,3-propanediol, 3-ethyl-2-isobutyl-1,3-propanediol, 1,3-butanediol, 1,4-butenediol, 1,5-pentanediol, 1,6-hexanediol, 1,10-decanediol, 2,2,4-trimethyl-1,6-hexanediol, 1,4cyclohexanediol, 1,2-cyclohexanedimethanol, 1,3-cyclohexanedimethanol, and 1,4-cyclohexanedimethanol.

The poly(tetramethylene terephthalate) of this invention can be prepared in accordance with techniques well known in the art, such as direct esterification, ester interchange and acidolysis. Preferably the polyesters are prepared by ester interchange. In this procedure, the dicarboxylic acid components are esterified to form a diester, such as dimethyl terephthalate, and the diester is ester interchanged with excess glycol to form the bis ester of the dimethyl terephthalate which is then polycondensed at high temperature and low pressure into a high molecular weight polymer through removal of glycol.

The poly(tetramethylene terephthalate) of this invention has an inherent viscosity of at least 0.5, preferably at least 0.6 and can be as high as 2.5 and is measured at 25° C. using 0.50 percent of polymer per 100 ml. of a solvent composed of 60 percent by weight of phenol and 40 percent by weight of tetrachloroethane.

The dimer acid useful in this invention can be described as a 36 carbon atom, long chain aliphatic dicarboxylic acid. The preparation and structure of the dimer acids are described in *Journal of American Oil Chemists Society*, 39, 534–545 (1962). It is generally prepared by dimerizing an unsaturated fatty acid containing 18 carbon atoms such as linoleic or linolenic acid or a monohydric alcohol ester thereof. It is recognized in the art that dimer acids are chemicals of unique properties. Several different grades of dimer acids are available commercially which vary in monomer and trimer content and iodine value. For example, dimer acid is available from Emery Industries, Inc., under the tradename Empol Dimer Acid. Preferably, the dimer acid used in this invention is substantially free of monomer and trimer fractions, which can be accomplished by distillation. Preferably, the dimer acid content is at least 95%. The dimer acid may be used in its hydrogenated or unhydrogenated form.

The polyester of dimer acid modified poly(tetramethylene terephthalate) can be prepared in a manner similar to the poly(tetramethylene terephthalate). Preferably, a diester of terephthalic acid and dimer acid or its diester are esterified with tetramethylene glycol to form the bis glycol esters of both acids and the bis glycol esters are polycondensed at high temperature and low pressure to form a high molecular weight polymer.

Catalysts well known in the art such as metal alkoxides can be used in the preparation of both poly(tetramethylene terephthalate) and dimer acid modified poly(tetramethylene terephthalate).

In this invention the poly(tetramethylene terephthalate) modified with dimer acid has an inherent viscosity of at least 0.5 and preferably at least 0.6, measured at about 25° C. using 0.5 percent of the polymer in a solvent composed of 60 percent by weight of phenol and 40 percent by weight of tetrachloroethane. Inherent viscosities of between 1.0 and 2.0 are often preferred.

The compositions of this invention composed of an admixture of both polyesters can be prepared according to techniques well known in the art. For example, granules of the poly(tetramethylene terephthalate) and granules of the poly(tetramethylene terephthalate) modified with dimer acid can be dry blended and molded on a screw extruder molding machine. Also the two components can be melt blended with conventional extrusion equipment prior to forming. Preferably, the admixture would be prepared commercially by dry blending of pellets prior to molding.

The compositions of this invention can be molded into useful articles using conventional apparatus and techniques. For example, articles can be prepared from the compositions of this invention using conventional injection molding equipment and methods.

The properties of the compositions of this invention can be modified by incorporation of various conventional additives such as pigments, inorganic fillers such as carbon black, silica gel, alumina, clays, chopped fiber glass, and flame retardants. Suitable conventional stabilizers can be added if desired.

As has been described, the compositions of this invention exhibit the combination of an unexpected balance of flexural modulus and flexural strength. In order to illustrate the desirable combination of flexural modulus and flexural strength of the compositions of this invention, a series of comparative experiments was conducted.

Four blends were prepared composed of 50 weigth percent poly(tetramethylene terephthalate) having an inherent viscosity of 1.18 and 50 weight percent of polyesters having inherent viscosities of 0.93, 1.03, 0.84 and 0.69 composed respectively of tetramethylene glycol, 10, 20, 40 and 60 mole percent dimer acid and a corresponding amount of terephthalic acid. These blends therefore contain 5, 10, 20 and 30 mole percent dimer acid.

Pellets of the blends were thoroughly dry mixed and extruded to form the admixture of the invention, which was injection molded into $5 \times \frac{1}{2} \times \frac{1}{8}$ inch flexural bars using a mold at about 25° C. on a Watson-Stillman injection molding machine.

Similar moldings were prepared from poly(tetramethylene terephthalate) modified with 5, 10, 20 and 30 mole percent dimer acid having inherent viscosities respectively of 1.17, 1.02, 1.03 and 0.94.

In order to investigate the flexural modulus and flexural strength of these compositions, the flexural strength is psi was measured in accordance with ASTM D790 for the compositions of the invention and the prior art. Also, the flexural strength in psi was measured in accordance with ASTM D790. These data are presented in Table 1.

Table 1

| | Poly(tetramethylene terephthalate) containing dimer acid | 50/50 Admixture of poly(tetramethylene terephthalate) and poly(tetramethylene terephthalate containing dimer acid |
|---|---|---|
| Mole percent dimer acid | 5 | 5 |
| Flexural Modulus, psi | $0.83 \times 10^5$ | $1.56 \times 10^5$ |
| Flexural Strength, psi | $3.85 \times 10^3$ | $6.68 \times 10^3$ |
| Mole percent dimer acid | 10 | 10 |
| Flexural Modulus, psi | $0.43 \times 10^5$ | $1.23 \times 10^5$ |
| Flexural Strength, psi | $2.5 \times 10^3$ | $5.57 \times 10^3$ |
| Mole percent dimer acid | 20 | 20 |
| Flexural Modulus, psi | $0.16 \times 10^5$ | $0.85 \times 10^5$ |
| Flexural Strength, psi | $1.13 \times 10^3$ | $3.21 \times 10^3$ |
| Mole percent dimer acid | 30 | 30 |
| Flexural Modulus, psi | $0.08 \times 10^5$ | $0.3 \times 10^5$ |
| Flexural Strength, psi | $0.50 \times 10^3$ | $1.37 \times 10^3$ |

As will be readily appreciated from a consideration of these data, the flexural modulus and flexural strength of the composition of the invention, composed of an admixture of poly(tetramethylene terephthalate) and poly(tetramethylene terephthalate) containing dimer acid, is much higher than the flexural modulus and flexural strength of the poly(tetramethylene terephthalate) containing dimer acid disclosed in the prior art. Specifically the flexural modulus of the poly(tetramethylene terephthalate) containing 10 mole percent dimer acid of the prior art is only $0.43 \times 10^5$ psi, while the flexural modulus of the admixture of the invention containing 10 mole percent dimer acid is $1.23 \times 10^5$ psi, or a 186 percent increase. Similarly the flexural strength of the polyester of the prior art is $2.5 \times 10^3$ psi, while the flexural strength of the admixture of the invention is $5.57 \times 10^3$ psi, or a 123 percent increase.

To further illustrate the unexpected results obtained by this invention, a copolymer comprising poly(tetramethylene terephthalate) and 40 mole percent dimer acid was prepared to an inherent viscosity of 0.79 (measured as set forth earlier herein). This copolymer was blended with poly(tetramethylene terephthalate) having a viscosity of 0.82. The blends contain 95, 90, 75, 25, 12.5 and 5 weight percent of the dimer acid copolymer and respectively, 5, 10, 25, 75, 87.5 and 95 weight percent of the poly(tetramethylene terephthalate) polymer. These blends were extruded and molded. Copolymers of poly(tetramethylene terephthalate) and dimer acid having the same levels of dimer acid as the blends were also extruded and molded. These copolymers had inherent viscosities of 0.85, 0.86, 0.94, 0.84, 0.84 and 0.82 respectively for the 38, 36, 30, 10, 5 and 2 mole percent concentrations of dimer acid.

As shown in the following table, the blends all have higher flexural modulus and flexural strength than the copolymers containing the same amount of dimer acid as the blends.

Table 2

| Copolymer Blend | | | | | Copolymer | | |
| --- | --- | --- | --- | --- | --- | --- | --- |
| Wt. % copolymer of poly(tetramethylene terephthalate) and 40 mole % dimer acid | Wt. % poly(tetramethylene terephthalate) | Mole % dimer acid in blend | Flexural modulus, psi | Flexural strength, psi | Copolymer of poly(tetramethylene terephthalate) and dimer acid, mole % dimer acid | Flexural modulus, psi | Flexural strength, psi |
| 95.0 | 5.0 | 38 | $0.10 \times 10^5$ | $0.62 \times 10^3$ | 38 | $0.02 \times 10^5$ | $0.20 \times 10^3$ |
| 90.0 | 10.0 | 36 | $0.13 \times 10^5$ | $0.77 \times 10^3$ | 36 | $0.03 \times 10^5$ | $0.31 \times 10^3$ |
| 75.0 | 25.0 | 30 | $0.57 \times 10^5$ | $2.33 \times 10^3$ | 30 | $0.08 \times 10^5$ | $0.50 \times 10^3$ |
| 25.0 | 75.0 | 10 | $2.14 \times 10^5$ | $7.68 \times 10^3$ | 10 | $0.41 \times 10^5$ | $2.38 \times 10^3$ |
| 12.5 | 87.5 | 5 | $2.34 \times 10^5$ | $8.37 \times 10^3$ | 5 | $1.12 \times 10^5$ | $4.67 \times 10^3$ |
| 5.0 | 95.0 | 2 | $2.60 \times 10^5$ | $10.50 \times 10^3$ | 2 | $1.83 \times 10^5$ | $7.70 \times 10^3$ |

To further illustrate the unexpected results obtained by our invention, the following experiment was run.

The data presented in Table 3 show that the polymer blend of this invention, poly(tetramethylene terephthalate) blended with poly(tetramethylene terephthalate) containing dimer acid, has higher flexural modulus and higher flexural strength than copolymers having the same composition. However, the polymer blend of poly(1,4-cyclohexylenedimethylene terephthalate) with poly(1,4-cyclohexylenedimethylene terephthalate modified with dimer acid does not increase in flexural modulus and flexural strength over the copolymer having the same composition and actually decreases in these properties.

Table 3

| | Poly(tetramethylene terephthalate) containing 10 mole percent dimer acid | 50/50 Admixture of poly(tetramethylene terephthalate) and poly(tetramethylene terephthalate containing 20 mole percent dimer acid |
| --- | --- | --- |
| Mole percent dimer acid | 10 | 10 |
| Flexural Modulus, psi | $0.43 \times 10^5$ | $1.23 \times 10^5$ |
| Flexural Strength, psi | $2.50 \times 10^3$ | $5.57 \times 10^3$ |

| | Poly(1,4-cyclohexylenedimethylene terephthalate) containing 10 mole percent dimer acid | 50/50 Admixture of poly(1,4-cyclohexylenedimethylene terephthalate and poly(1,4-cyclohexylene dimethylene terephthalate containing 20 mole percent dimer acid |
| --- | --- | --- |
| Mole percent dimer acid | 10 | 10 |
| Flexural Modulus, psi | $2.03 \times 10^5$ | $1.55 \times 10^5$ |
| Flexural Strength, psi | $7.88 \times 10^3$ | $6.96 \times 10^3$ |

The invention has been described in detail with particular reference to preferred embodiments thereof, but it will be understood that variations and modifications can be effected within the spirit and scope of the invention.

We claim:

1. A composition comprising an admixture of
(A) from about 95 to about 5 parts by weight poly(tetramethylene terephthalate) having an inherent viscosity of about 0.5 or more measured at 25° C. using 0.50 percent of polymer per 100 ml. of a solvent composed of 60 percent by weight of phenol and 40 percent by weight of tetrachloroethane, and (B) from about 5 to about 95 parts by weight of a polyester having an inherent viscosity of about 0.5 or more measured at 25° C. using 0.50 percent of polymer per 100 ml. of a solvent composed of 60 percent by weight of phenol and 40 percent by weight of tetrachloroethane prepared from
  (1) a dicarboxylic acid component which is
    (a) from about 98 to about 40 mole percent terephthalic acid, and
    (b) from about 2 to about 60 mole percent dimer acid, and
  (2) tetramethylene glycol.

2. A composition of claim 1, wherein (a) is about 95 to about 40 mole percent terephthalic acid, and (b) is about 5 to about 60 mole percent dimer acid.

3. A composition of claim 1, wherein (a) is about 90 to about 60 mole percent terephthalic acid, and (b) is about 10 to about 40 mole percent dimer acid.

4. A composition comprising an admixture of
(A) from about 95 to about 50 parts by weight poly(tetramethylene terephthalate) having an inherent viscosity of about 0.5 or more measured at 25° C. using 0.5 percent of polymer per 100 ml. of a solvent composed of 60 percent by weight of phenol and 40 percent by weight of tetrachloroethane, and
(B) from about 5 to about 50 parts by weight of a polyester having an inherent viscosity of about 0.5 or more measured at 25° C. using 0.50 percent of polymer per 100 ml. of a solvent composed of 60 percent by weight of phenol and 40 percent by weight of tetrachloroethane prepared from
  (1) a dicarboxylic acid component which is
    (a) from about 98 to about 40 mole percent terephthalic acid, and
    (b) from about 2 to about 60 mole percent dimer acid, and
  (2) tetramethylene glycol.

5. A composition of claim 4, wherein (a) is about 95 to about 40 mole percent terephthalic acid, and (b) is about 5 to about 60 mole percent dimer acid.

6. A composition of claim 4, wherein (a) is about 90 to about 60 mole percent terephthalic acid, and (b) is about 10 to about 40 mole percent dimer acid.

7. A composition comprising an admixture of
(A) from about 95 to about 75 parts by weight poly(tetramethylene terephthalate) having an inherent viscosity of about 0.5 or more measured at 25° C. using 0.50 percent of polymer per 100 ml. of a solvent composed of 60 percent by weight of phenol and 40 percent by weight of tetrachloroethane, and
(B) from about 5 to about 25 parts by weight of a polyester having an inherent viscosity of about 0.5 or more measured at 25° C. using 0.50 percent of polymer per 100 ml. of a solvent composed of 60 percent by weight of phenol and 40 percent by weight of tetrachloroethane prepared from
  (1) a dicarboxylic acid component which is
    (a) from about 98 to about 40 mole percent terephthalic acid, and
    (b) from about 2 to about 60 mole percent dimer acid, and
  (2) tetramethylene glycol.

8. A composition of claim 7, wherein (a) is about 95 to about 40 mole percent terephthalic acid, and (b) is about 5 to about 60 mole percent dimer acid.

9. A composition of claim 7, wherein (a) is about 90 to about 60 mole percent terephthalic acid, and (b) is about 10 to about 40 mole percent dimer acid.

10. A composition comprising an admixture of
(A) from about 90 to about 10 parts by weight poly(tetramethylene terephthalate) having an inherent viscosity of about 0.5 or more measured at 25° C. using 0.50 percent of polymer per 100 ml. of a solvent composed of 60 percent by weight of phenol and 40 percent by weight of tetrachloroethane, and
(B) from about 10 to about 90 parts by weight of a polyester having an inherent viscosity of about 0.5 or more measured at 25° C. using 0.50 percent of polymer per 100 ml. of a solvent composed of 60 percent by weight of phenol and 40 percent by weight of tetrachloroethane prepared from
  (1) a dicarboxylic acid component which is
    (a) from about 98 to about 40 mole percent terephthalic acid, and
    (b) from about 2 to about 60 mole percent dimer acid, and
  (2) tetramethylene glycol.

11. A composition of claim 10, wherein (a) is about 95 to about 40 mole percent terephthalic acid, and (b) is about 5 to about 60 mole percent dimer acid.

12. A composition of claim 10, wherein (a) is about 90 to about 60 mole percent terephthalic acid, and (b) is about 10 to about 40 mole percent dimer acid.

* * * * *